April 18, 1933.  A. F. MORRIS  1,904,163
DRAFT DEVICE
Filed April 30, 1931   2 Sheets-Sheet 1
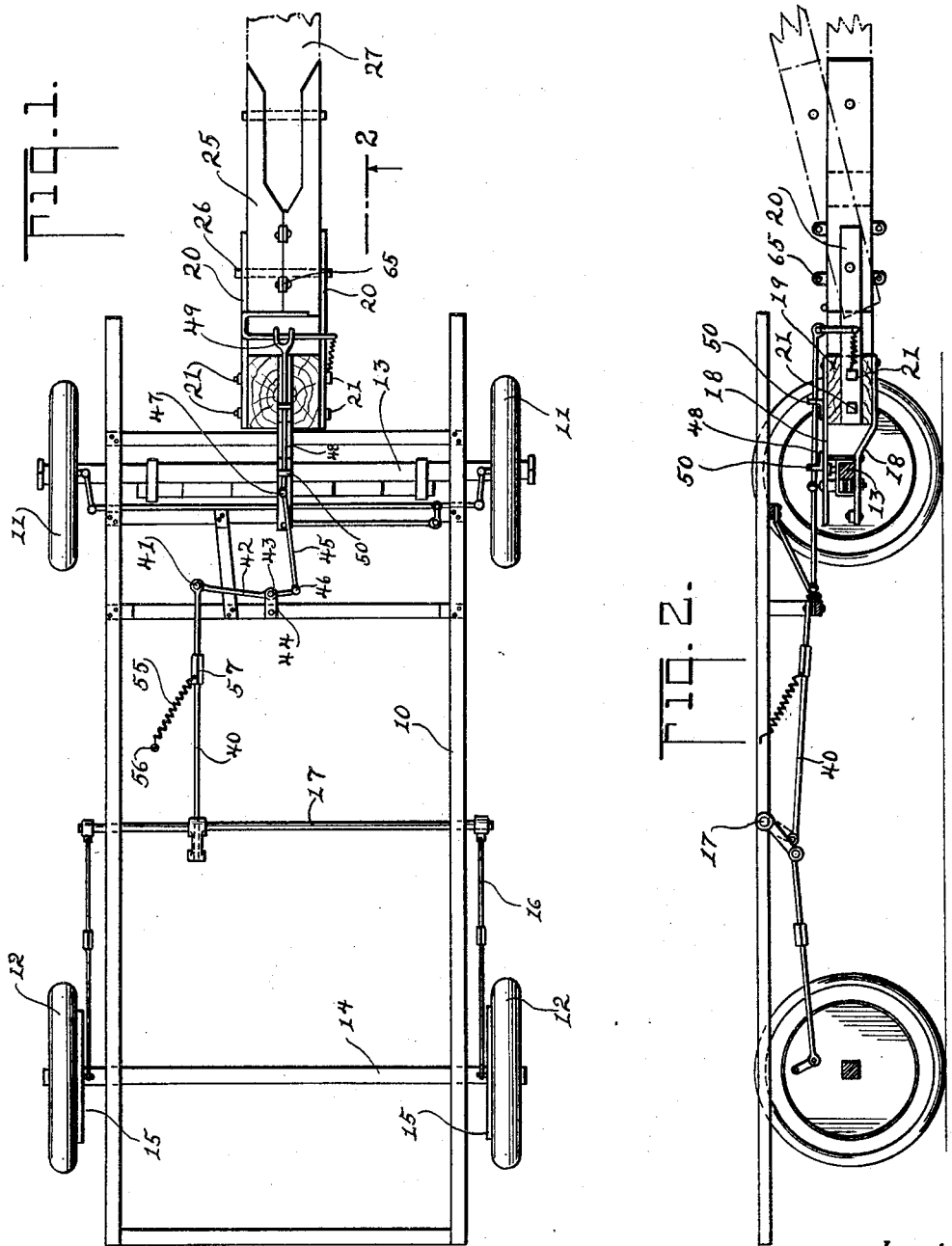
Inventor
ANDERSON F. MORRIS
By Clarence A. O'Brien
Attorney

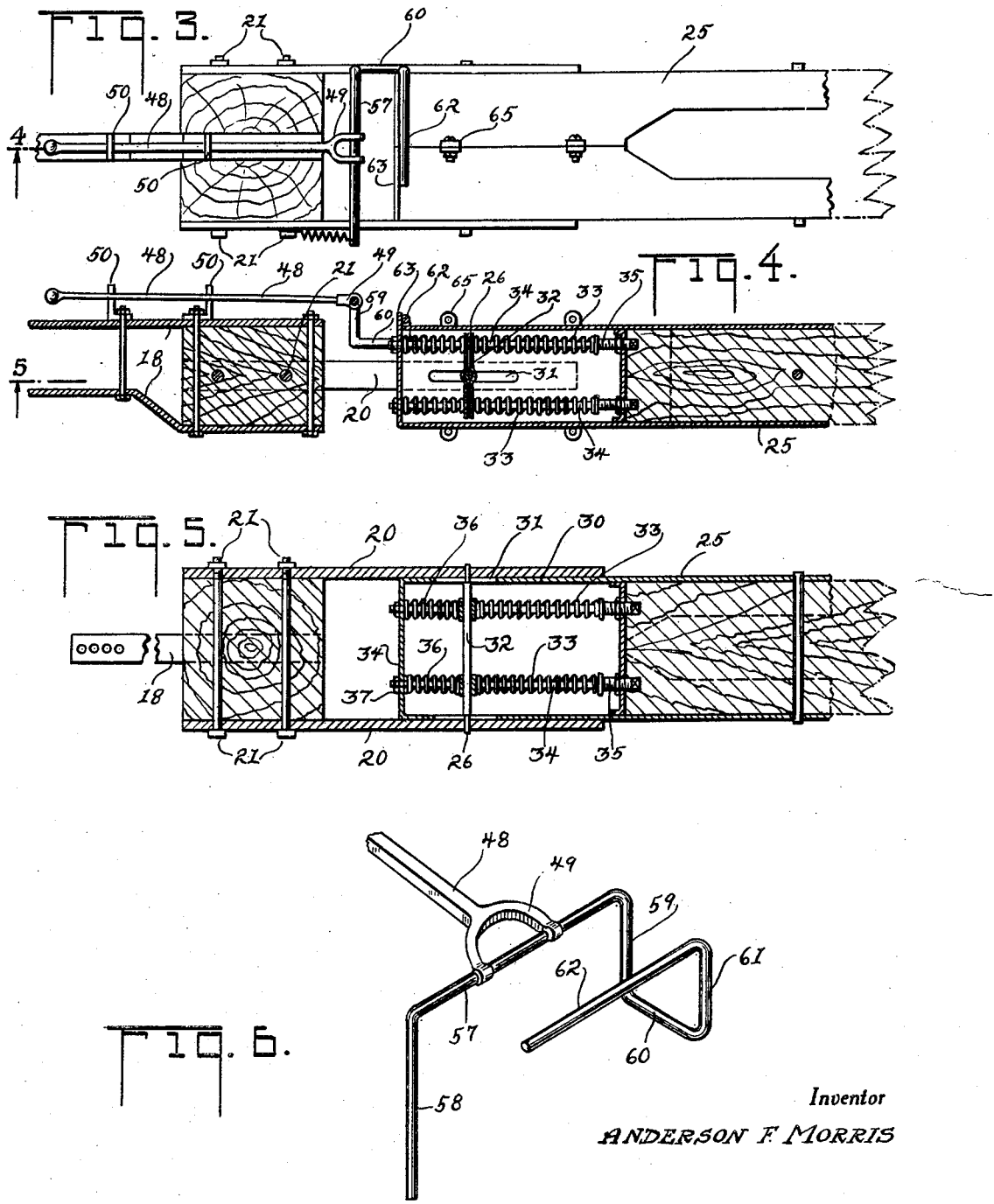

Patented Apr. 18, 1933

1,904,163

UNITED STATES PATENT OFFICE

ANDERSON F. MORRIS, OF WEIR, TEXAS

DRAFT DEVICE

Application filed April 30, 1931. Serial No. 534,070.

This invention relates to new and useful improvements in draft devices, and more particularly it pertains to draft devices especially adapted for hauling trailers.

It is one of the objects of the present invention to provide a draft device for trailers by which device a trailer may be drawn either by means of a motor vehicle or by draft animals such as horses or the like.

A further object of the invention resides in the provision of a device by means of which severe shocks and jars incident to travel over rough road and unequal application of power to the trailer may be absorbed without transmission to either the trailer, the motor vehicle or draft animals by which the trailer is being drawn.

A further object of the invention resides in the provision of brakes adapted to operate upon the rear wheels of a trailer and also to provide a construction whereby the trailer brakes will be automatically operated to retard the forward movement of the trailer automatically at the desired time.

Other objects of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings,

Figure 1 is a top plan view of a trailer chassis constructed in accordance with the present invention, a portion of the draft tongue thereof being illustrated, Figure 2 is a longitudinal sectional view thereof, taken on the line 2—2 of Figure 1, Figure 3 is an enlarged detail view in elevation illustrating the connection of the draft tongue with the trailer, Figure 4 is a longitudinal sectional view taken on the line 4 of Figure 3, Figure 5 is a longitudinal sectional view taken on the line 5 of Figure 4, and Figure 6 is a detail perspective view illustrating a portion of the mechanism.

Referring more specifically to the drawings, the trailer chassis comprises a frame 10, front wheels 11, and rear wheels 12. The front wheels 11 are mounted upon a front axle 13 and the rear wheels 12 are mounted upon a rear axle 14. The rear wheels are provided with brake drums 15 operated by brake rods 16 from a cross shaft 17, this construction being substantially conventional in motor vehicle brakes.

Suitably secured by brackets or the like 18 to the forward axle 13 of the trailer, there is a block or the like 19. Projecting forwardly from the block 19, there are two supports 20 in the form of straps or the like which are secured as at 21 to the block 19. These supports 20 provide for the pivotal mounting of a housing or the like 25 said housing being pivotally mounted by means of a pin or the like 26 which extends through the housing and through the supports as best illustrated in Figures 1 and 2 of the drawings.

The housing 25 heretofore mentioned is carried by a draft tongue or the like 27, and this tongue may be of a type which is especially adapted for use in connection with a motor vehicle, or it may be of a longer type for use for drawing the trailer by draft animals. Whichever the type of tongue employed, the pivotal pin or mounting 58 thereof provides for interchangeability thereby permitting the use of either type of tongue.

As best illustrated in Figures 4 and 5 of the drawings, the housing 25 projects beyond the rear end of the tongue as indicated at 30 in these figures and the cross pin 26 which forms the pivotal mounting of the tongue and this housing 25 passes through slots or the like 31 in the side walls of the housing in order that the tongue may have longitudinal movement in the supports 20. The pivotal point or pin 26 carries plates or the like 32 and interposed between these plates 32 and the rear end of the tongue, there are four coil prings 33 which coil springs surround bolts or the like 34. The bolts 34 are anchord in the tongue and threaded thereon are adjusting nuts 35 by means of which the tension of the springs 33 and 36 may be adjusted to the desired degree. Interposed between the plates 32 and the rear end 34 of the housing 25, there are four coil springs 36 which are also mounted on the bolts 34.

From the foregoing, it will be apparent that as the tongue moves in the supports or relative to the support 20, its movement in either direction will be cushioned, that is if the tongue is moved rearwardly in the support 20, the springs 33 form a cushion therefor and if the tongue moves forwardly of the support 20, the springs 36 form a cushion therefor. Thus the reciprocating movement of the tongue relative to the support 20 is cushioned and both the trailer and the draft means whether it be a vehicle or animals, are relieved from sudden jars and shocks incident to the movement of the trailer and its draft means over a roadway.

Means is provided for applying the brakes of the trailer as the draft vehicle or animals are brought to a stop, and in the present invention this means comprises a rod 40 connected to an arm carried by the transversely extending shaft 17. This rod 40 is pivotally connected as at 41 to a lever 42 pivoted as at 43 in bracket or the like 44. A forwardly extending rod 45 is connected to the lever 42 by means of a ball and socket joint 46 and at its forward end this rod 45 is connected by means of a ball and socket joint 47 to a rod or the like 48 the forward end of which is preferably forked as at 49. The rod 48 is slidably mounted in guides or the like 50. Thus it will be apparent that as the rod 48 is moved rearwardly, the rod 40 will be moved forwardly through the medium of the rod 45 and the pivoted lever 42, to rock the shaft 17 about its axis and apply the brakes through the medium of the brake rods 16. A spring 55 may be secured to the chassis as at 56 and at its other end as at 57 to the rod 40 and this spring insures the return of the rod 40 to its normal position when the braking strain is relieved and thus the brakes will be released.

Carried by the forked end 49 of the rod 48, there is a clip which clip comprises a straight portion 57 having two downwardly bent legs 58 and 59. The downwardly bent leg 59 is extended horizontally as at 60, has an upwardly bent leg 61 parallel with the leg 59 which terminates in an extended portion 62 parallel with the portion 57. As best illustrated in Figure 4, the portion 62 of this member lies behind an ear 65 on the top of the housing adjacent the rear end thereof and a flange 63 at the rear of the housing provides a space between itself and the ear 65 in which the part 62 lies. The spring 70 connected to one of the bolts 21 and the part 68 of the clip acts in conjunction with the spring 55 to hold the parts in position with the brake released. Thus it will be seen that as the tongue and housing moves rearwardly, or the trailer moves forwardly faster than the tongue and housing, the part 62 of the clip will be engaged by the ear 65 so that the rods 48 and 45 will be moved rearwardly and thus the lever 42 will move the rod 40 forwardly to apply the brake. The springs 55 and 70 will act to hold the brake in released position until the ear 65 engages the part 62 and pushes the clip rearwardly as before described. If these springs fail to release the brake upon the forward movement of the tongue and housing 25 the flange 63 will engage the part 62 and thus move the rods and lever 42 to a position to release the brakes.

Thus it will be apparent that when the draft vehicle or animal is stopped, an application of the brakes will be had and that when draft power is applied the brakes will be released and that these two operations will be automatic.

Furthermore it will be apparent that the present invention provides a device in which the several shocks incident to the pulling of a trailer will be absorbed without being transmitted either to the trailer or the draft device, While the invention has been herein illustrated in a preferred form, it is to be understood that the invention is not to be limited to the specific construction herein shown, and that it may be practiced in other forms without departing from the spirit thereof.

Having thus described the invention, what is claimed as new, and what it is desired to secure by United States Letters Patent, is:

1. Means for pivotally and slidably connecting a tongue of a trailer to the front axle thereof comprising, a housing connected with the rear end of the tongue, a pair of forwardly extending members connected with the front axle of the trailer and between which the housing extends, said housing having slots in its sides, a pin passing through the slots and having its ends supported in the forwardly extending members for pivotally and slidably connecting the tongue to the axle, a vertically arranged member connected with the pin and located in the housing, spring means in the rear part of the housing having the front end engaging the said vertically arranged member for resisting forward movement of the housing and tongue between the forwardly extending members and spring means in the forward part of the housing having the rear end engaging said vertically arranged member for resisting rearward movement of the tongue housing between the forwardly extending members.

2. In combination with a trailer having brakes and a tongue, a housing connected with the rear end of the tongue, a pair of forwardly extending members connected with the front axle of the trailer and between which the housing extends, said housing having slots in its sides, a pin passing through the slots and having its end supported in the forwardly extending members for pivotally and slidably connecting the housing and tongue between said forwardly extending members, a vertically arranged member connected with the pin and located in the housing, spring means in the rear part of the housing having the front end engaging the said vertically arranged member for resisting forward movement of the housing between the said members, spring means in the forward part of the housing having the rear end engaging said vertically arranged member for resisting rearward movement of the housing between the said forwardly extending members, a projection on the top of the housing adjacent the rear end thereof, a second projection on the top of the housing at the rear end thereof and forming with the first mentioned projection a space, a clip including a horizontal part passing through said space whereby said clip will be moved rearwardly when engaged by the first mentioned projection when the trailer moves forwardly relative to the tongue or the tongue moves rearwardly relative to the trailer and said clip is moved forwardly by the second projection when the tongue moves forwardly relative to the trailer or the trailer moves rearwardly relative to the tongue, a bar having its front end connected with the clip, a lever supported on the trailer, a bar connecting one end of said lever with the rear end of the first-mentioned bar, a brake rod connected with the opposite end of the lever, spring means for normally holding the parts in a position to keep the brakes of the trailer in released position.

3. In combination with a trailer having brakes, a brake rod connected with the brakes, a lever pivoted to a part of the trailer and having one end connected with said brake rod, a bar connected with the opposite end of said lever, a rod having a ball and socket connection at its rear end with the front end of the last-mentioned bar, said ball and socket connection being arranged adjacent the front axle of the trailer, forwardly extending members connected with the front axle, a tongue supported for sliding and pivoted movement by said forwardly extending members, said tongue having a pair of upwardly extending projections thereon spaced apart, a clip connected to the front end of the rod and having a horizontal part passing through the space between said projections whereby rearward movement of the tongue or forward movement of the trailer with respect to the tongue will cause the forward projection to engage the clip and move the rod and lever to a position to apply the brakes.

In testimony whereof I affix my signature.
ANDERSON F. MORRIS.